United States Patent [19]

Kirwan

[11] 4,221,521
[45] Sep. 9, 1980

[54] APPARATUS FOR LOOSENING FROZEN COAL IN HOPPER CARS

[75] Inventor: George B. Kirwan, Huntington, W. Va.

[73] Assignees: The Chesapeake and Ohio Railway Company, Cleveland, Ohio; The Baltimore and Ohio Railroad Company, Baltimore, Md.

[21] Appl. No.: 869,614

[22] Filed: Jan. 16, 1978

[51] Int. Cl.² ............................................. B65G 67/24
[52] U.S. Cl. ...................................... 414/375; 299/69; 366/120
[58] Field of Search .................... 214/64.2, 44 A, 83.3; 366/120, 121, 122, 123; 299/14, 69, 70; 173/43; 414/375, 525, 394; 238/382, 283

[56] References Cited

U.S. PATENT DOCUMENTS

| 1,138,627 | 5/1915 | Considine | 214/44 A |
| 1,911,966 | 5/1933 | Pickop | 366/122 |
| 2,406,546 | 8/1946 | Kinney et al. | 214/44 A |
| 2,507,749 | 5/1950 | Bacheldor | 214/64.2 |
| 3,945,566 | 3/1976 | Bush | 238/283 |
| 3,974,776 | 8/1976 | Deivernoise, Jr. | 238/382 |

FOREIGN PATENT DOCUMENTS 179220 3/1966 U.S.S.R. .................................. 414/375

Primary Examiner—Stephen G. Kunin
Assistant Examiner—Edmond G. Rishell, Jr.
Attorney, Agent, or Firm—Cushman, Darby & Cushman

[57] ABSTRACT

Frozen lumps of coal in conventional hopper cars are loosened by lowering an assembly of vertically oriented probe elements into the car while simultaneously vibrating the assembly. The vibratory structure is mounted on a gantry arrangement which also supports a supplemental probe arrangement utilizing impact forces to loosen coal in hopper cars having interiors different from those of the cars operated on by the vibratory arrangement.

4 Claims, 4 Drawing Figures

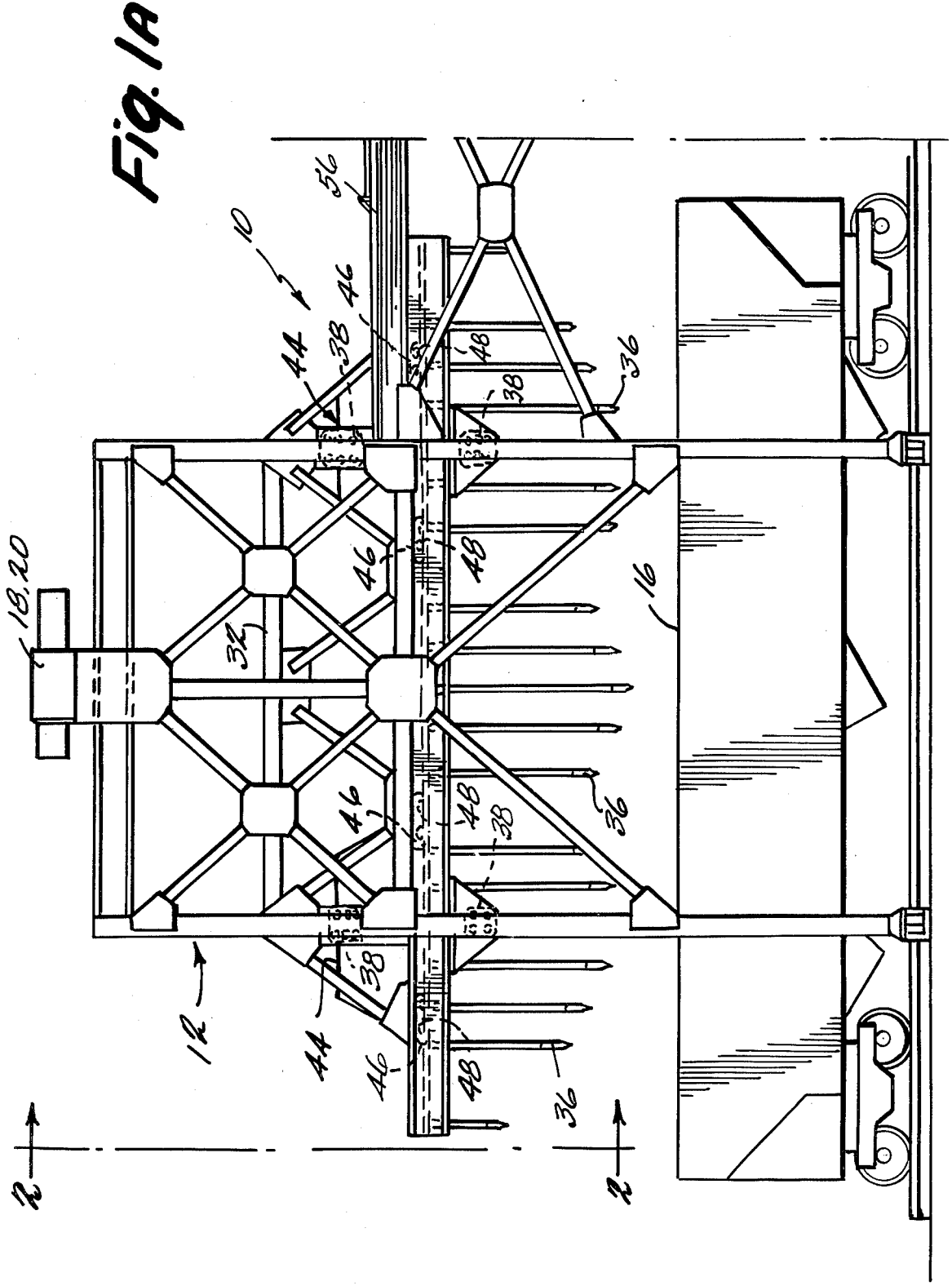

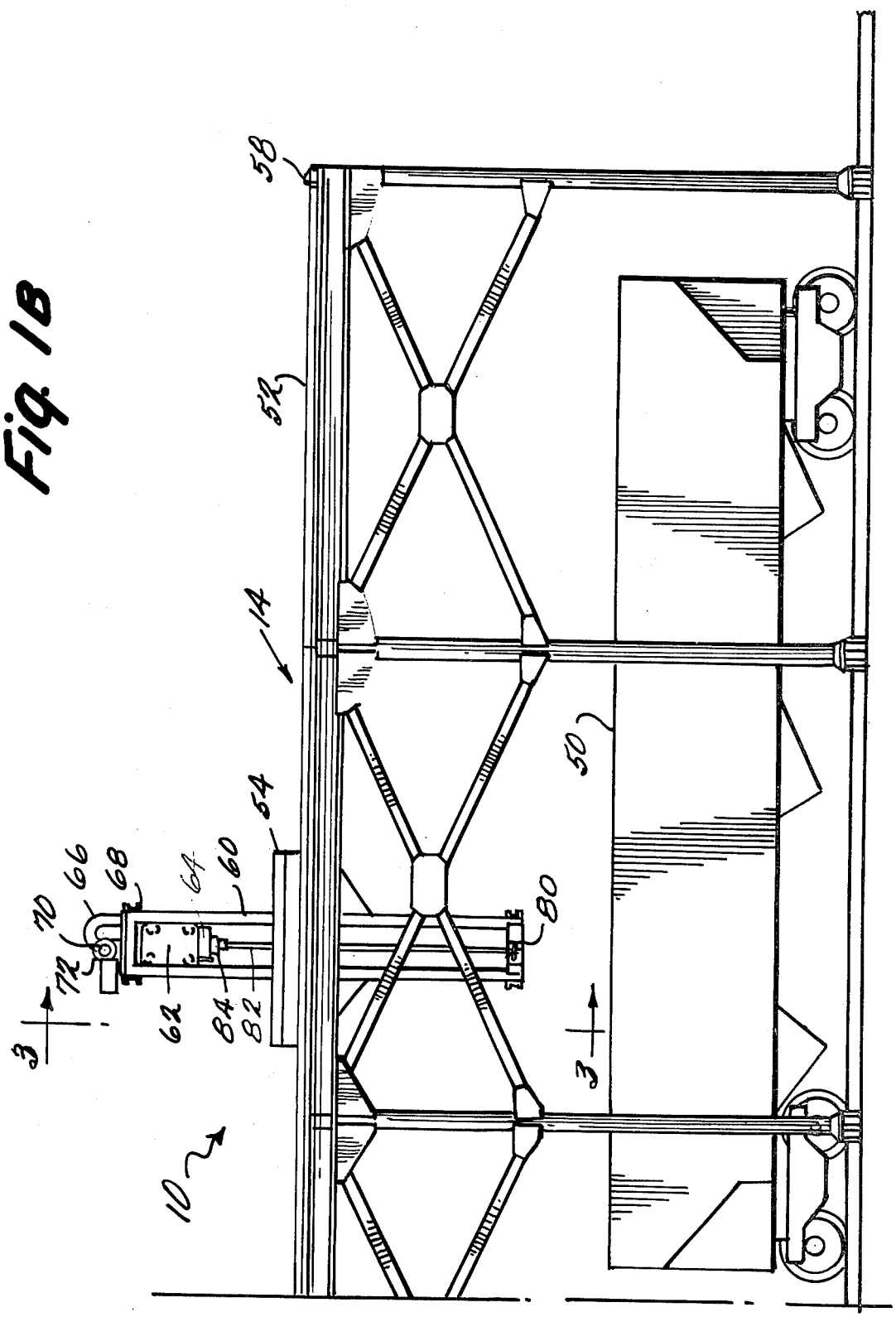

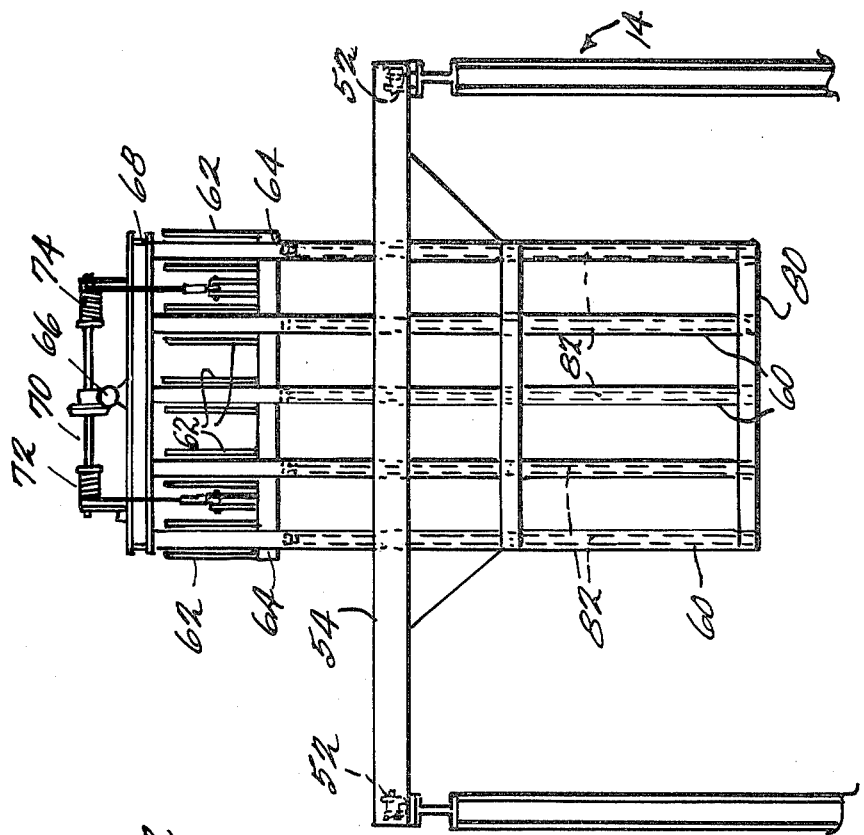
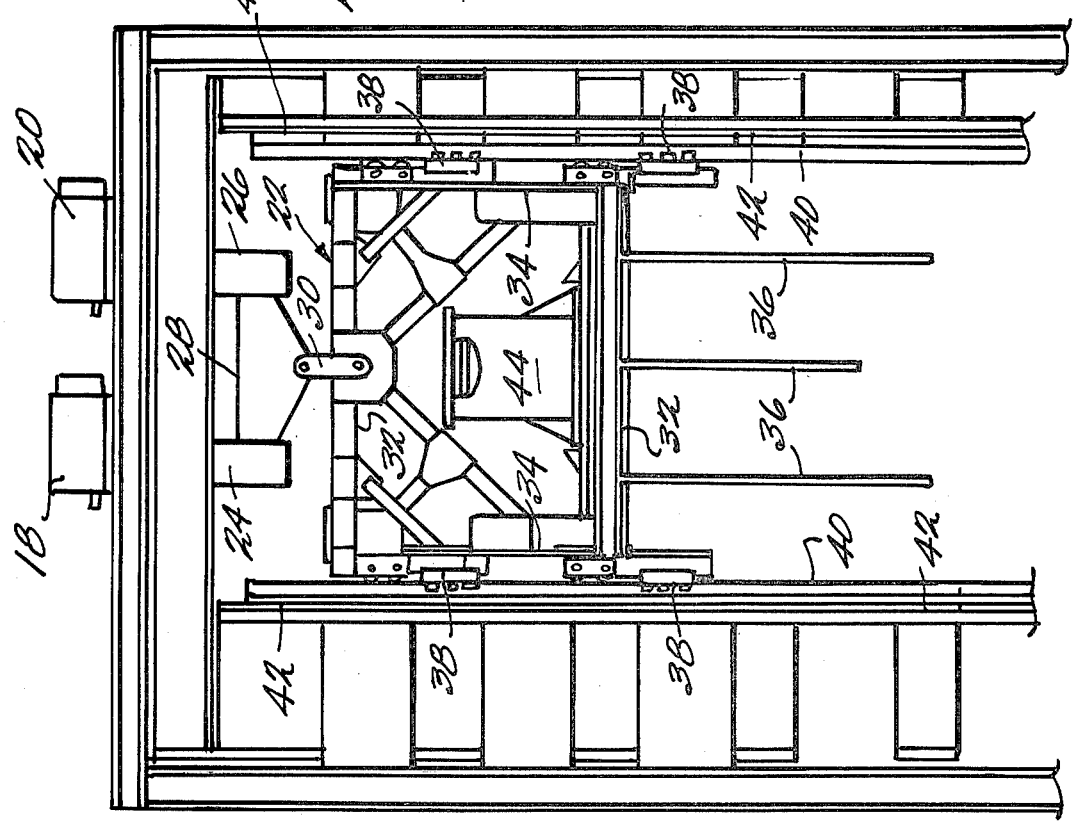

APPARATUS FOR LOOSENING FROZEN COAL IN HOPPER CARS

BACKGROUND OF THE INVENTION

With emphasis on the use of coal as an energy source, a problem of increasing concern is the transporting and handling of coal during periods of extreme cold. More particularly, coal carried by hopper cars freezes into large masses which are difficult to dump and which cause damage to equipment such as belts, rollers, etc., utilized in coal dumping facilities.

Various approaches to the solution of this problem have previously been proposed. For example. in U.S. Pat. No. 1,212,252—which issued to Menotti Pellegrino on Jan. 16, 1917, a plurality of spear-like elements are lowered into a coal car while the exterior of the car is simultaneously struck by hammers. The intended effect is to loosen coal within the car. However, such an arrangement has the important shortcoming of causing damage to the hopper car.

Another method disclosed in the prior art is that described in U.S. Pat. No. 3,181,799 which issued on May 4, 1965 to Warren F. Wurzburg et al. This patent relates to an arrangement wherein frozen coal is loosened by applying high intensity vibrational energy to the coal. More particularly, such energy is produced by an electrically operated transducer which develops ultrasonic energy for vibration purposes. However, such an arrangement would appear to require the application of a tremendous amount of power in order to effectively loosen frozen coal within a hopper car.

A still further prior art arrangement is that disclosed in U.S. Pat. No. 2,108,416 which was granted to Abraham E. Smith et al on Feb. 15, 1938. This patent is concerned with a method of loosening material within a railway car by permanently installing agitating devices in the car which are actuated to loosen the car contents. Obviously, such an arrangement is expensive and probably is not suitable for use with large masses of material such as frozen coal.

SUMMARY OF THE INVENTION

The shortcomings of prior art arrangements for loosening the contents of a railway car are overcome by the present invention. More particularly, an assembly of vertically extending probes supported by a gantry are lowered into a hopper car while vibratory energy simultaneously is applied to the assembly. Consequently, as the probes descend, the frozen coal is loosened.

A probe assembly specifically designed for maximum effectiveness when used with a particular interior configuration of a conventional hopper car, such as a 3-hopper type, may not be suited for use with hopper cars of differing interior sizes and shapes. Consequently, to supplement the vibratory arrangement just described, an additional probe arrangement is provided on the gantry. More particularly, a plurality of impact-imparting probes are mounted on a travelling carriage supported by the gantry. These probes are actuated by conventional means, such as air rams, to impact the frozen coal, thereby breaking it into smaller lumps.

A system such as just disclosed produces a number of advantages. For example, the use of car-striking arrangements which may cause car damage are avoided. The reduction in size of the lumps of coal resulting from the improved loosening arrangement reduces damage to the dumping equipment while simultaneously accelerating the coal dumping process. This, of course, reduces the cost of handling the coal, expedites the availability of hopper cars and permits increased tonnage to be transported. Such economies in turn permit further savings. For example, mine closings can be avoided which otherwise would occur if the coal could not be transported. Of course, the ability to move increased tonnage reduces the cost of supplying the coal to the user.

BRIEF DESCRIPTION OF THE DRAWINGS

Further details of the invention will become apparent from the following description and by reference to the accompanying drawings wherein:

FIGS. 1A and 1B are side elevational views of apparatus for loosening frozen coal in hopper cars according to the present invention;

FIG. 2 is an end view of a portion of the vibratory coal loosening apparatus taken along lines 2—2 of FIG. 1A; and FIG. 3 is an end view of a portion of the impact coal loosening apparatus taken along lines 3—3 of FIG. 1B.

DETAILS OF THE INVENTION

Referring to FIGS. 1A and 1B of the drawings, a gantry generally indicated at 10 is provided for supporting coal loosening devices. The gantry 10 includes a portion 12 associated with vibratory probes and a portion 14 associated with impact probes.

Details of the gantry portion 12 can be appreciated by reference to both FIGS. 1A and 2. Portion 12 spans a railroad track and a conventional 3-hopper railway car, indicated at 16 in FIG. 1A. A pair of electrically operated hoists 18 and 20 are mounted on the upper horizontal structural elements of the gantry portion 12. These hoists are joined to a probe assembly 22 (FIG. 2) through an equalizer arrangement. More particularly, the hooks (not shown) of hoists 18 and 20 are connected to members 24 and 26, respectively, which are joined to opposite ends of a plate 28. A connecting link 30 is pivotally joined to plate 28 at the lower central portion thereof, and at its opposite end, link 30 is pivotally connected to the probe assembly 22. By such an arrangement, the load imposed on the two hoists by assembly 22 is equalized.

The probe assembly 22 comprises a framework of horizontally and vertically oriented structural members 32 and 34 joined in a generally box-like configuration. A plurality of vertically oriented probe elements 36 are fixed to assembly 22 in a conventional manner and project downwardly from the underside of this assembly. As can be appreciated from FIG. 1A, the probes 36 are of differing lengths arranged so as to permit effective entry into the three hoppers of car 16.

The assembly 22 on its gantry-facing sides is provided with a plurality of roller carriages 38 which engage vertically oriented tracks 40 (FIG. 2) which are joined through resilient cushioning elements 42 to the gantry 12. The rollers of carriages 38 are arranged to engage opposite sides and upper surfaces of the tracks 40 so that as the hoists 18 and 20 raise and lower the framework 22, the movement of the latter will be in a controlled path. The necessity for this provision will become apparent hereinafter.

The assembly 22 supports at opposite ends thereof devices which are known as car shakers. Such devices are well known in the art and are produced by various suppliers such as Allis Chalmers of Appleton, Wisconsin. These car shakers are designated by the numeral 44 in the drawings.

A car shaker is a device designed to vibrate an object to which it is joined. For example, car shakers typically are employed to engage the upper side edges of a railway car carrying loose material. The shaker is provided with an eccentric shaft arrangement whereby energization of a motor causes the shaker to vibrate, thereby imparting such movement to the object connected to the shaker.

In the present case, the shakers 44 are utilized to vibrate the assembly 22 which supports the probe elements 36. This is accomplished by securing the elongated shoe-like base portions 46 of the shakers to horizontally extending beams 48 which form additional structural elements of the framework 22. Beams 48 extend transversely of the direction of orientation of the hopper car 16. Consequently, when the shakers 44 are operated, the probes 36 vibrate generally along a path extending in the direction of the length of car 16. The cushioning elements 42 absorb vibration which otherwise would be imparted to the gantry 12 via the tracks 40. However, the cushioning material is sufficiently flexible so as not to substantially impede the ability of the probe assembly to vibrate.

As can be appreciated from the description just presented, when a car 16 containing frozen coal is positioned beneath gantry portion 12 and the shakers 44 are actuated, the lowering of probes 36 into the car by appropriate operation of hoists 18 and 20 causes the frozen mass of coal to be broken into small lumps. At the lowermost position of the probe assembly 22, the tips of probes 36 are located near the bottom of the hoppers within car 16. Accordingly, the entire contents of the car are exposed to the vibratory action of the probes. The hoists 18 and 20 then are reversed to withdraw the probes from the hopper car in preparation for similar operation on another car.

As the probe assembly 22 is lowered to cause the probes 36 to engage a frozen mass of coal, it is essential that the path of movement of the frame 22 be controlled. If it were not, engagement of the vibrating probe ends with the upper surface of the frozen mass could cause the assembly to be displaced from its normal path, resulting in possible damage to the probes and/or the hopper car. Such a situation is avoided by utilization of the carriages 38 and 40, previously described.

Referring now to the structure associated with gantry portion 14, FIG. 1B illustrates a hopper car 50 positioned within the space spanned by portion 14. The gantry portion serves as a support for a pair of spaced tracks 52 which accommodate a carriage 54. The carriage is driven by motor means (not shown) so as to be movable along the tracks between stops 56 (FIG. 1A) and 58.

Carriage 54 serves as a mounting platform for equipment utilized to actuate additional probes. More particularly, the carriage supports a plurality of spaced frame portions, generally indicated as 60. Each portion 60 is generally in the form of an elongated rectangle having its major dimension in the vertical direction, the rectangles being oriented in spaced parallel planes which extend in a direction parallel to tracks 52. A roller carriage 62 is mounted within, and is supported by, the vertical elements of each frame portion 60. These carriages 62 are combined in a unitary assembly by being joined to a cross member 64, the latter being adapted to be raised and lowered by a hoist 66 supported by an additional cross member 68 secured to the upper ends of the frame portions 60. More specifically, the hoist is associated with a shaft 70, drums 72 and 74 and flexible lines 76 and 78, which are joined to the cross member 64 as indicated in FIG. 3. Thus, when hoist 66 is operated, the carriages 62 move simultaneously in vertical paths which are controlled by their respective frame portions 60.

In addition to cross members 64 and 68, the frames 60 are joined together at their lowermost ends by an additional cross member 80. A probe element 82 extends downwardly below each of the carriages 62. Each probe 82 is operatively related to an air ram 84 which is supported by the cross member 64. The air rams are arranged to provide limited movement to their respective probes 82 in a vertical direction. The lowermost ends of the probes 82 project through apertures in the cross member 80. Consequently, the latter serves to guide and support the probes as they are actuated by the air rams.

When a car 50 bearing frozen coal is positioned beneath gantry portion 14, the carriage 54 is appropriately positioned above a portion of the frozen mass which is to be acted upon. Hoist 66 then is selectively energized to move the probes to a position proximate the mass at which time the air rams are actuated (by conventional means which have been omitted from the drawings for convenience of illustration) to drive the probes downwardly to impact the coal and to retract the probes. This action is repeated in the manner of a jack hammer such that the successive impacts of the probes break the frozen coal into smaller lumps. Movement of the carriage 54 along tracks 52 permits the entire mass within the hopper car to be acted upon.

As in the case of carriages 38 associated with gantry portion 12, the carriages 62 permit the probes 82 to be moved in controlled paths so as to insure that the probes effectively operate on the frozen coal.

With the arrangement just described, it is apparent that separate cars 16 and 50 can be positioned within the area spanned by gantry 10 so as to be simultaneously operated upon by the vibratory probes associated with gantry portion 12 and the impact probes associated with gantry portion 14.

The arrangement which has been described is particularly suitable for breaking up a frozen mass of coal within a hopper car. However, it is apparent that it may be used with other frozen materials which are difficult to manage. By utilizing the disclosed arrangement, it is unnecessary for impact forces to be directed against the hopper car itself. Additionally, no special modifications to the hopper cars are required.

What is claimed is:

1. Apparatus for loosening a frozen mass of coal in railway hopper cars, comprising:
   a gantry adapted to span said cars;
   hoist means supported by said gantry;
   a framework operatively joined to said hoist means and vertically movable in response to operation of the hoist means;
   guide means joined to said gantry and operatively related to the framework to control vertical movement of the framework to a defined path, said guide means including vertically oriented tracks joined to the gantry through cushioning means and roller means connected to the framework and adapted to engage the tracks;

a plurality of probes extending downwardly from said framework, said probes terminating in ends located at different levels conforming to the interior contour of the car being operated upon; and shaker means supported by said framework and operative to impart vibratory movement to said probes as the framework is lowered by the hoist means to cause the probes to engage the frozen mass, said shaker means including a pair of shakers supported at opposite ends of the framework and arranged to impart said vibratory movement in a direction generally longitudinally of the car spanned by the gantry.

2. Apparatus for loosening a frozen mass of coal in railway hopper cars, comprising:

a gantry adapted to span said cars;

hoist means supported by said gantry, said hoist means including a pair of hoists joined to opposite ends of a generally horizontally extending plate member;

a framework operatively joined to the hoist means by a connecting link pivotally connected at one of its ends to said plate member at a location intermediate the ends of the member, and pivotally connected at its other end to the framework, said framework being vertically movable in response to operation of the hoist means;

a plurality of probes extending downwardly from said framework; and shaker means supported by said framework and operative to impart vibratory movement to said probes as the framework is lowered by the hoist means to cause the probes to engage the frozen mass.

3. Apparatus for loosening a frozen mass of coal in railway hopper cars, comprising:

a gantry adapted to span said cars;

hoist means supported by said gantry;

a framework operatively joined to said hoist means and vertically movable in response to operation of the hoist means;

a plurality of probes extending downwardly from said framework;

shaker means supported by said framework and operative to impart vibratory movement to said probes as the framework is lowered by the hoist means to cause the probes to engage the frozen mass;

carriage means supported by said gantry at a distance horizontally spaced from said hoist means and framework, said carriage means being adapted to move longitudinally with respect to a car spanned by said gantry;

additional frame means mounted on said carriage;

a plurality of additional spaced probes supported for vertical movement by the additional frame means; and means for reciprocating the additional spaced probes to impact said probes on the frozen mass contained in said car.

4. Apparatus as set forth in claim 3, wherein said reciprocating means are air rams.

* * * * *